United States Patent [19]

Chambaret et al.

[11] Patent Number: 5,519,797
[45] Date of Patent: May 21, 1996

[54] ARRANGEMENT OF A LIGHTING SOURCE WITH AN OPTICAL FIBER AND A STEERABLE LIGHT BEAM

[75] Inventors: Yves Chambaret, Paris; Roberto Benavente, Versailles, both of France

[73] Assignees: Ermax, Chatillon Sous Bagneaux; Ad Sign, Paris, both of France

[21] Appl. No.: 242,588

[22] Filed: May 13, 1994

[30] Foreign Application Priority Data

May 14, 1993 [FR] France .................................. 93 05869

[51] Int. Cl.$^6$ ..................................................... G02B 6/26
[52] U.S. Cl. .................. 385/25; 385/33; 385/36; 385/18; 385/23; 359/837
[58] Field of Search ............................. 385/36, 44, 15, 385/16, 17, 18, 901, 20, 21, 22, 18, 23, 25, 26, 42, 33; 359/831, 837

[56] References Cited

U.S. PATENT DOCUMENTS

| | | | |
|---|---|---|---|
| 3,433,940 | 3/1969 | Baez et al. | 240/2.1 |
| 4,411,490 | 10/1983 | Daniel | 350/96.10 |
| 4,539,475 | 9/1985 | Bosse | 359/837 |
| 4,611,885 | 9/1986 | Boirat | 385/25 |
| 4,641,915 | 2/1987 | Asakawa et al. | 385/26 |
| 4,703,995 | 11/1987 | Mori | 385/25 |

FOREIGN PATENT DOCUMENTS

| | | |
|---|---|---|
| 0148350 | 10/1984 | European Pat. Off. . |
| 2542063 | 3/1983 | France . |
| WO87/00907 | 12/1987 | WIPO . |

*Primary Examiner*—John Ngo
*Attorney, Agent, or Firm*—Pennie & Edmond

[57] ABSTRACT

A lighting source arrangement comprising a light conducting cable formed of an optical fibre consisting of a plurality of elementary fibres, a device for holding and fastening the optical fibre onto a supporting structure and means for steering the light beam issuing from the fibre, wherein said fastening device is a device for holding the optical fibre in a stationary position and the device for steering the light beam emitted by the fibre comprises at least one member for deviating the beam which is mounted rotatably about the axis of the optical fibre onto a stationary holder.

8 Claims, 2 Drawing Sheets

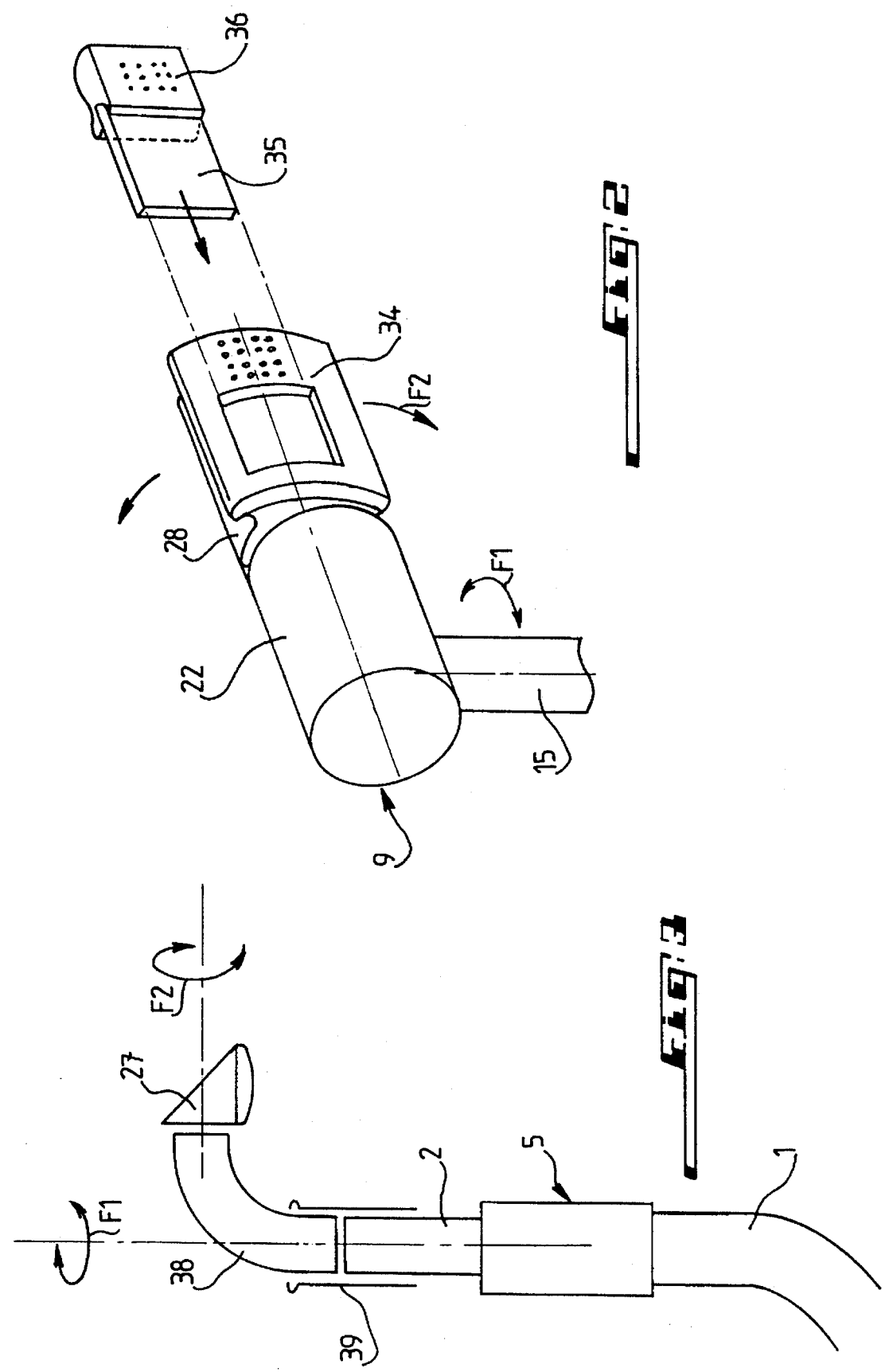

ARRANGEMENT OF A LIGHTING SOURCE WITH AN OPTICAL FIBER AND A STEERABLE LIGHT BEAM

The invention relates to an arrangement for a lighting or illuminating source of the type comprising a light conducting cable made as an optical fibre consisting of a plurality of elementary fibres, a device for retaining and fastening the optical fibre onto a supporting structure and means for steering or swivelling the light beam issuing from the fibre.

In lighting source arrangements of this kind, the fastening device is provided so as to also perform the function of the means for steering or swivelling the light beam. For that purpose this device comprises a fibre holding portion which is movably mounted in a supporting portion. The orientation of the light beam is then achieved by a suitable orientation of the retaining portion in the supporting portion.

This known lighting source arrangement exhibits the inconvenience that the optical fibre is subjected at each steering operation to mechanical stresses in its portion located upstream of the fastening device.

The object of the present invention is to provide a lighting source arrangement which permits an easy steering or swivelling of the light beam without exhibiting the inconvenience of the prior art.

To reach this goal the fastening device is a device for keeping the optical fibre in a stationary position and the means for steering the light beam emitted by the fibre comprise at least one beam deviating member such as a member comprising a surface for the total reflection of the beam, which is inclined with respect to the latter and the angle of inclination of which is variable or a light conductor with a curved shape.

According to a characterizing feature of the invention, the steering member is formed of a total-reflection prism which is mounted on a holder for rotation about an axis coinciding with the axis of the beam.

According to another advantageous characterizing feature of the invention, the steering means comprises a second total-reflection member which is mounted in the beam reflected by the first member and the reflecting surface of which is steerable, the second one being advantageously formed of a total-reflection prism.

According to still another characterizing feature of the invention, an optical lens device is mounted within the light beam downstream of the first steering member and the second steering member is movably mounted for translatory motion in the axis of the beam downstream of the said lens.

The invention will be better understood and further objects, characterizing features, details and advantages thereof will appear more clearly as the following description proceeds with reference to the accompanying diagrammatic drawings given by way of non-limiting examples only illustrating two presently preferred embodiments of the invention and in which:

FIG. 2 is a perspective view of the arrangement according to FIG. 1; and

Figure 1:
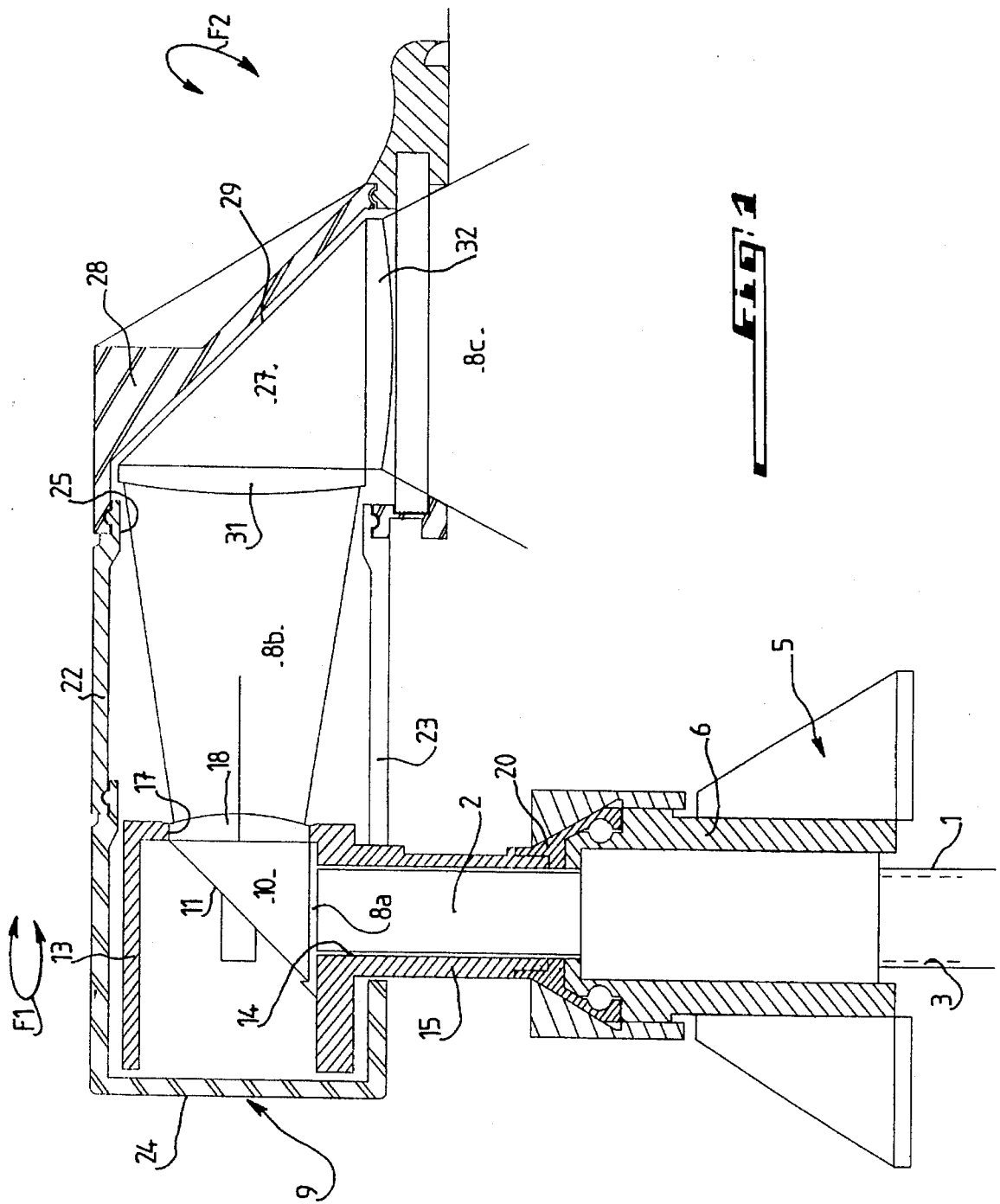
FIG. 1 is a view in axial section through a first embodiment of a lighting arrangement with an optical fibre according to the present invention.

FIG. 3 diagrammatically shows a second embodiment of a lighting source arrangement according to the invention.

On FIG. 1 the reference numeral 1 designates a light conducting cable which comprises an optical fibre 2 consisting of a plurality of elementary fibres and is surrounded by a sheath 3. The end of the cable 1 is held in a stationary position on a supporting structure not shown by a fastening device 5 which comprises a sleeve-like element 6 which coaxially surrounds the cable 1. It is seen that the light emitting end extends out of or projects from the sleeve 6 over a predetermined length which allows the mounting on this end of the device for steering the light beam which will be emitted by the fibre and is diagrammatically designated at 8. The letters a, b and c designate different parts of the beam which follow each other along the axis of the latter. The steering device carries the general reference numeral 9.

This steering device 9 comprises a first total-reflection member 10 for the light beam issuing from the optical fibre 2 and shown at 8a. This member is made as a total-reflection prism which is formed of a rectangular-isosceles prism and the hypotenuse surface 11 of which forms the reflecting surface. This prism is placed within an hollow body 13 with an outer cylindrical surface which is formed with a bore 14 in its peripheral wall underneath the prism. At the level of this bore 14, the body 13 comprises a tubular end part 15 which projects radially and exhibits a greater diameter than the diameter of the optical fibre 2 so that it may be fitted or slipped thereover for being rotatable according to the arrow F1. As shown on FIG. 1, the prism 10 is placed in such a manner inside of the body 13 that the reflecting surface 11 is in front of the bore 14 while being inclined by an angle of 45° with respect to the axis of the latter and the axis of the optical fibre 2. The body 13 exhibits on its front wall a window 17 for the exit of the light beam 8b after the reflection of the beam upon the inclined surface 11. The prism 10 comprises on its outlet face a converging lens 18 inserted into the window 17. The prism 10 and the lens 18 may be made in one single piece through injection molding.

The cylindrical end portion 15 of the body 13 may be fitted with its end onto a part 20 which is rotatably mounted on the end of the sleeve 6 of the device 5 for fastening the optical cable 1. The end of the end part 15 may be made fast to the part 20 in any suitable manner for unitary rotation therewith.

The body 13 is coaxially mounted inside of a cylindrical casing 22 while supporting the latter. The casing 22 is axially movable with respect to the body 13 and exhibits for that purpose in its peripheral part an opening 23 for the passage of the end part 15 of the body 13. The casing 22 is closed at the level of the open end of the body 13 and is open at its other end which extends beyond the lens 18.

The device 9 for steering the light beam emitted by the optical fibre comprises a second rectangular-isosceles total-reflection prism 27 which is arranged within a supporting body 28 so that the beam 8b issuing from the first prism 10 may be reflected by its reflecting surface 29 to form the outcoming beam 8c. The supporting part 28 is rotatably mounted onto the open end 25 of the casing 22, i.e. about the axis of the beam 8b as shown by the arrowed line F2. The prism 27 carries on its face for the inlet of the beam 8b a converging lens 31 and on its surface for the outlet of the beam 8c a converging or diverging lens 32. The prism 27 and the lenses 31 and 32 may be made in one single piece through injection molding.

As shown on FIG. 2, the supporting part 28 of the prism 27 comprises at the level of the exit of the light beam 8c a projecting portion 34 which is adapted to receive an optical filter 35 mounted onto a gripping member 36.

It appears from the description which has just been made with reference to FIGS. 1 and 2 that through rotation of the steering device about the axis of the optical fibre 2 in the direction of the arrow F1 owing to the coaxial arrangement of the end part 15 on the fibre 2, the beam 8b may be freely swivelled angularly in a plane perpendicular to the axis of the optical fibre 2. Owing to the rotation of the supporting piece 28 together with the second prism 27 about the axis of the beam 8b in the direction of the arrow F2, the exiting beam 8c is freely steerable in space. By displacing the casing 22 axially with respect to the body 13 for supporting the prism 10, i.e. by moving the prism 27 along the axis of the beam 8b and owing to the lenses, the angle of divergence of the beam 8c is variable. It should further be noted that the use of a prism as a total-reflection member exhibits the advantage of a greater index of reflection, thereby permitting to obtain a smaller diameter of the reflected beam with respect to a plane mirror.

FIG. 3 shows a second embodiment of an arrangement according to the invention, wherein a rigid light conductor consisting of fibres fused together and which is shaped as an arc of a circle of 90°, is rotatably mounted onto the end of the optical fibre 2 by means of a mounting bushing diagrammatically shown at 39. On the free end of the conductor 38 may be rotatably mounted a prism in the manner of the prism 27 of the first embodiment.

Of course many modifications may be brought to the invention such as described and shown on the figures provided that the essential characteristic features of the invention be retained, which reside in the fact that the cable 1 together with its optical fibre 2 is held in a stationary position and that the orientation of the light beam emitted by the optical fibre is provided by an optical device which is steerable or swivable without exposing the optical fibre to mechanical stresses. The device for steering the beam in view of its compact, not very bulky structure with a small weight may be mounted onto the support of the fibre. It should however be pointed out that supporting means for the steering device may be provided, which are independent of the device for supporting the optical fibre. The prisms may be swivelled manually or if need be in a remote-controlled manner in any known suitable fashion.

What is claimed is:

1. A lighting source arrangement comprising a light conducting cable made as an optical fiber article having an inlet and outlet for a light beam, and formed of a plurality of elementary fibers; means for steering the light beam issuing from the fiber article, said steering means comprising a first beam deviating member located at the outlet of the optical fiber article and mounted for rotation about the axis thereof; a device for fastening the optical fiber article onto a supporting structure and for holding the optical fiber article in a stationary position, said fastening means comprising a second beam deviating member for deviating the light beam issued from the first beam deviating member, support means for movably locating said second beam deviating member in the path of the beam issued from said first deviating member, along the axis thereof, and optical means for enabling variation of the angle of divergence of the beam issued by said second beam deviating member upon said movement of the second beam deviating member along the axis of said beam issuing from said first beam deviating member, wherein the first deviating member is mounted in a casing provided with a tubular end part for conducting the light from the optical fiber to the first deviating member and includes means for positioning the casing on the end of the optical fiber and wherein the second deviating member is rotatably mounted onto the casing, both deviating members being arranged within the casing so that said deviating members carry out a relative motion along the axis of the beam deviated by the first member.

2. A lighting source arrangement comprising a light conducting cable made as an optical fiber article having an inlet and outlet for a light beam, and formed of a plurality of elementary fibers; means for steering the light beam issuing from said fiber article, said steering means comprising a first beam deviating member located at the outlet of the optical fiber and mounted for rotation about the axis of the article, and a device for fastening the optical article onto a supporting structure and for holding the optical fiber article in a stationary position, said fastening means comprising a second member for deviating the light beam, movably mounted for translatory motion along the axis of the beam deviated by the first deviating means; and an optical device associated with the first and second deviating members so as to permit together with the axial displacement of the second deviating member, a variation of the angle of divergence of the exiting beam, wherein the first deviating member is mounted in a casing provided with a tubular end part for conducting the light from the optical fiber article to the first deviating member and includes means for positioning the casing on the end of the optical fiber article and wherein the second deviating member is rotatably mounted onto the casing, both deviating members being arranged within the casing so that said deviating members carry out a relative motion along the axis of the beam deviated by the first member.

3. An arrangement according to claim 2, wherein the first and second deviating members each comprise a surface for the total reflection of the beam, which is inclined with respect to the beam and the angle of inclination of which is variable.

4. An arrangement according to claim 2, wherein the first deviating member is mounted in a supporting body comprising the aforesaid end part, this body being disposed inside of the casing provided with an axial slot for the passage of the end part so that the casing be axially movable with respect to the body carrying the first deviating member.

5. An arrangement according to claim 4, wherein the tubular end piece is mounted onto the device for holding the cable in a stationary position coaxially with the optical fibre.

6. An arrangement according to claim 5, wherein the first deviating member comprises a total-reflection prism.

7. An arrangement according to claim 6, wherein the prism has a rectangular-isosceles shape and its hypotenuse surface forms the total-reflection surface.

8. A lighting source arrangement comprising a light conducting cable made as an optical fiber article having an inlet and outlet for a light beam, and formed of a plurality of elementary fibers; means for steering the light beam issuing from the article, said steering means comprising a first beam deviating member located at the outlet of the article and mounted for rotation about the axis thereof, a device for fastening the optical fiber article onto a supporting structure and for holding said article in a stationary position; a second beam deviating member for deviating the light beam issued from the first beam deviating member; support means for movably locating said second beam deviating member in the path of the beam issuing from said first beam deviating member along the axis thereof; and optical means for enabling variation of the angle of divergence of the beam issued by said second beam deviating member upon said movement of the second beam deviating member along the axis of said beam issuing from said first beam deviating member.

* * * * *